Aug. 10, 1948.  E. E. WEMP  2,446,730
PRESSURE CONTROL FOR HYDRAULIC SYSTEMS
Filed Feb. 18, 1946  3 Sheets-Sheet 2
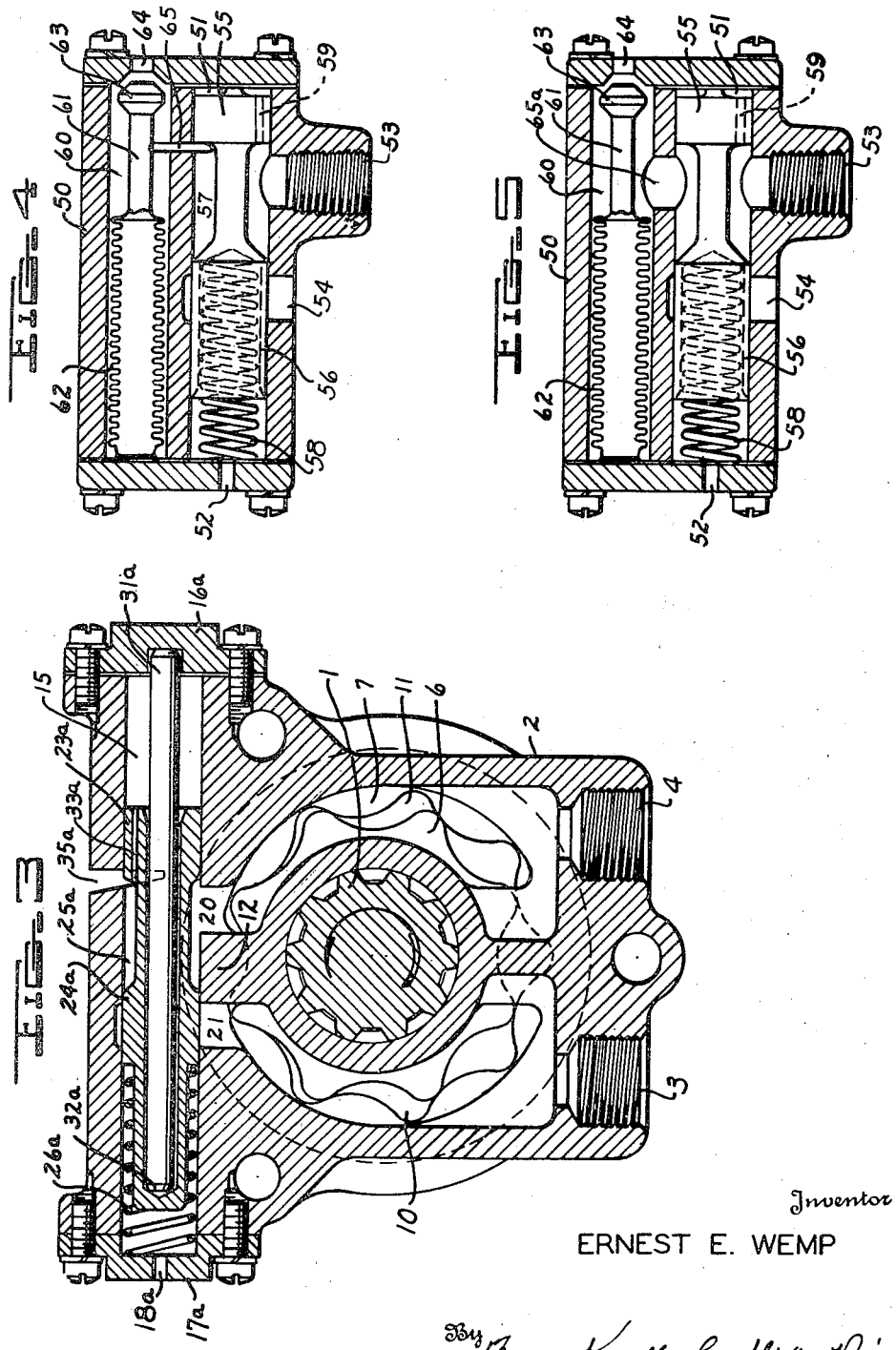
Inventor
ERNEST E. WEMP Aug. 10, 1948. E. E. WEMP 2,446,730
PRESSURE CONTROL FOR HYDRAULIC SYSTEMS
Filed Feb. 18, 1946 3 Sheets-Sheet 3

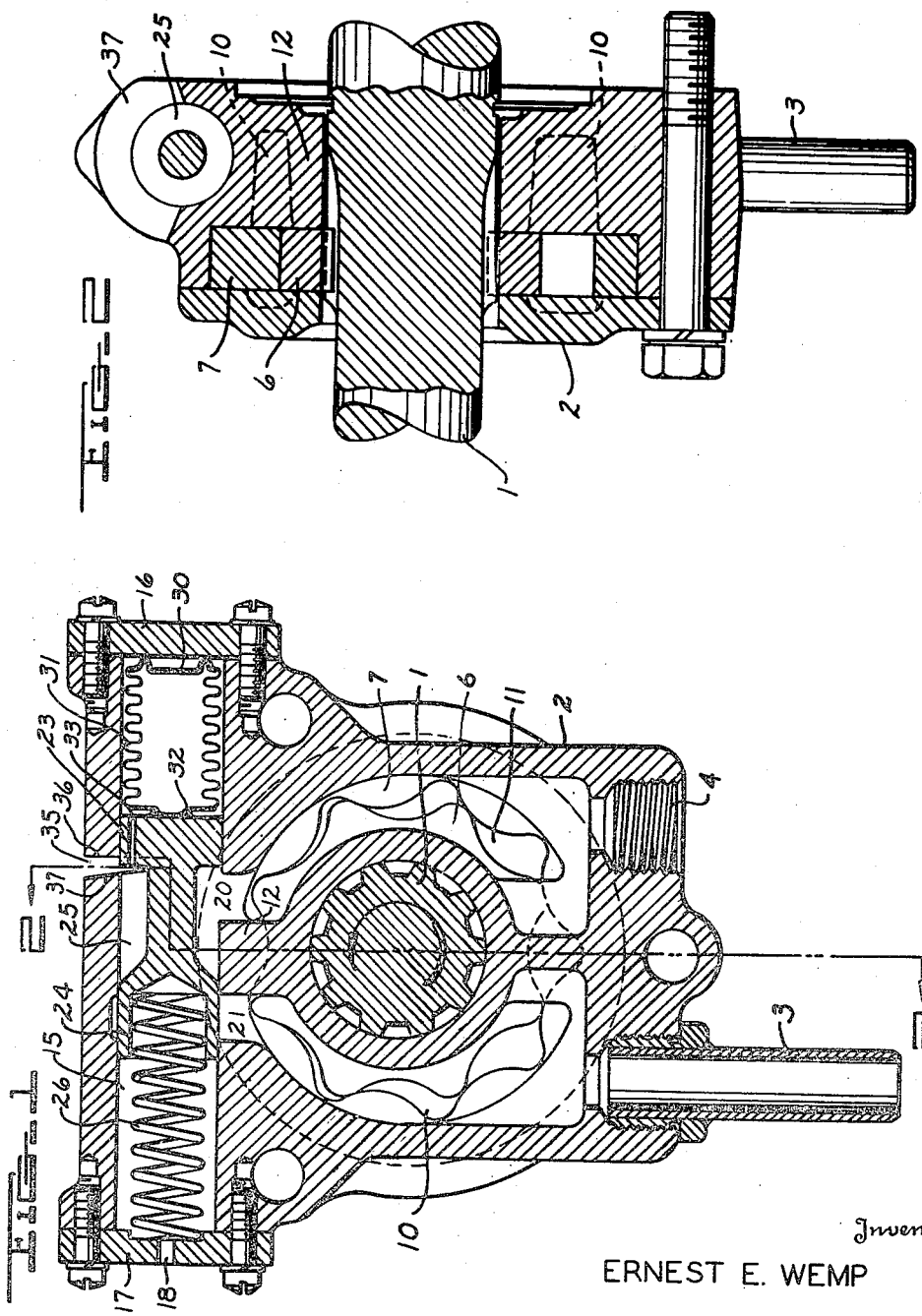

Inventor
ERNEST E. WEMP
By Barnes, Kisselle, Laughlin & Raisch
Attorneys

Patented Aug. 10, 1948

2,446,730

UNITED STATES PATENT OFFICE 2,446,730

PRESSURE CONTROL FOR HYDRAULIC SYSTEMS

Ernest E. Wemp, Detroit, Mich., assignor of five per cent to Eleanor May Wemp, Los Angeles, Calif., twenty per cent to Lila A. Wemp, five per cent to Leah Kathleen Smith, and five per cent to Clyde J. Smith, all of Detroit, Mich.

Application February 18, 1946, Serial No. 648,255

14 Claims. (Cl. 103—42)

This invention relates to the control of a hydraulic system and it has to do particularly with the control of the pressure in such systems. The invention is directed particularly to the control of the pressure in the hydraulic system where the liquid under pressure is employed for governing or controlling mechanism in the power transmission line of an engine and particularly an internal combustion engine of an automotive vehicle. Of course, the invention is not limited to such use but it is expedient to make the disclosure herein in connection with such use.

As is well known to those versed in the art, power transmitting mechanism in an automotive vehicle usually employs a ratio changing mechanism, commonly called a transmission, by which the driving ratio between the engine and the traction wheels may, for reasons well understood by automobile operators, be varied. And, also a clutch of one kind or another is employed to completely break the power transmission line so that the engine may operate while the vehicle is at rest. This clutch may be incorporated as a part of or as separate from the transmission itself.

In providing an automatically controlled power transmitting means, which may include the transmission and clutch, or either one of them, the liquid pressure of a hydraulic system may be employed and the present invention is directed to the control of this pressure in order to obtain the desired controlling action on the transmission. For example, when an internal combustion engine is cold it requires a relatively high idling speed and with a pump which is operated by the engine, the pressure in the hydraulic system is increased in accordance with the high idling speed. Unless otherwise controlled, this increase of pressure will cause an actuation of the transmission controls when such actuation is not desired. Accordingly, the invention aims to provide a pressure relief valve arrangement which is sensitive to both speed and temperature. Being sensitive to temperature, the pressure relief valve may be so constructed and arranged to provide the proper and desired functions of the power transmitting mechanism when the engine and the hydraulic medium is cold and to also provide the desired or proper function when the engine and the medium become heated in use and finally reaches normal running temperatures.

In the accompanying drawings:

Fig. 1 is a cross sectional view taken through a pump and illustrating the pressure relief valve constructed as a part of the pump.

Fig. 2 is a sectional view taken substantially on line 2—2 of Fig. 1.

Fig. 3 is a view similar to Fig. 1 showing a modified form of temperature control for the valve.

Fig. 8 is a graph which illustrates the type of pressure curves which may be obtained.

Fig. 9 is a developed view of a relief port of the relief valve.

Figure 5:
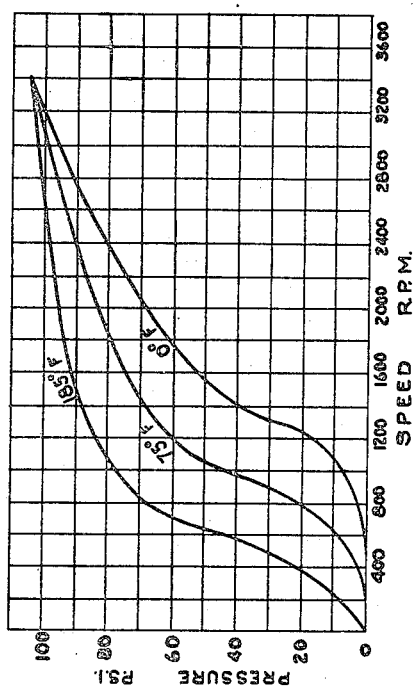
Fig. 5 is a view similar to Fig. 4 illustrating an arrangement where the pressure controlling action and the temperature controlling action function on the valve at all times and operate, so to speak, in parallel.

As illustrated in Fig. 1 there is an operating shaft 1 which may be operated directly by an internal combustion engine and assembled about the shaft is a pump structure having a housing 2 with an intake 3 and a discharge 4. The intake is to take liquid from a suitable sump and it is pumped under pressure through the outlet 4.

The pump illustrated is one provided with a toothed rotor 6 which turns with the shaft 1 and a cooperating rotor 7 with an interior configuration which generally corresponds to the shape of the rotor 6 but which has a greater number of depressions than the projections on the rotor 6. This pump is of a well-known variety and when operating in a counter-clockwise direction, as shown in Fig. 1, the space between the two elements on the left hand side, as the figure is viewed, and as illustrated at 10, opens to receive liquid while on the other side the space as shown at 11 closes. It will be noted that the passages for the inlet and the outlet are in a plane removed from the rotary elements, by reference to Fig. 3, and that there is a dividing partition 12 which separates the inlet side from the outlet side.

The relief valve, as shown in Figs. 1 and 2, is constructed as a part of the pump and it comprises a cylinder 15 closed at one end as at 16 and at the other end as at 17, this end being provided with a vent port 18. The high pressure side of the pump communicates with the cylinder through a port 20 and the low side communicates with the cylinder through a port 21.

Within the cylinder in a piston valve having a piston head or land 23 at one end and a piston head or land 24 at its opposite end with the restricted intermediate part providing a passage or port 25. The piston is spring pressed in one direction as by means of a coil spring 26 and a temperature sensitive seat or stop for the piston is provided for the other end of the piston. As shown in Fig. 1, this temperature sensitive seat comprises a sealed chamber of the expansible and contractable type having an end wall 30 which seats against the head 16 and a corrugated wall 31 extending in an axial direction relative to the cylinder and having an opposite end wall 32 arranged to abut the piston valve. The end heads 30 and 32 are sealed to the corrugated wall and thus a chamber is formed. This chamber is filled with a substantially incompressible liquid selected so that it has the desired expansion and contracting characteristics incident to temperature changes to provide a variously positioned seat for the piston valve. The liquid, of course, is selected so that it will properly function over the desired temperature range. The land 23 of the piston is provided with a port 33 which connects the port 25 with the space between the land and the cylinder head 16.

The cylinder is provided with a relief or exhaust port 35 arranged to be opened and closed by the land 23 as the piston valve moves in its function. This port is preferably constructed so that it has a radial wall 36 and an inclined or tapered wall 37. The port, as shown in the drawings, is in the form of a kerf made by a cutting instrument and it extends substantially to the center line of the cylinder as indicated in Fig. 2. The manner of operation of the device and the results obtained by this structure will be set forth following the description of other forms of the invention.

In Fig. 3, a combined pump body and valve is illustrated, which, for the most part is of the same structure as is illustrated in Fig. 1 and the same reference characters are applied to like parts. The essential modification in this form is the temperature sensitive seat. The seat shown in Fig. 3 at 31a comprises a rod or bar of material having the desired coefficient of expansion. One end seats in a recess in the cylinder head 16a. To provide adequate length for the seat the valve piston is provided with a central bore into which the rod extends and its opposite end seats against the piston as at 32a. It will be noted that the piston is elongated over the form shown in Fig. 1 to provide the necessary length for the rod and the end adjacent the spring 26a is of reduced diameter so as to extend into the spring, the spring reacting against the head 17a which is ported at 18a. The piston is otherwise constructed similar to the piston shown in Fig. 1 with a head or land 24a, a head or land 23a with the intermediate passage or port 25a and the port 33a. The cylinder is provided with the pressure relief port 35a constructed the same as the port shown in Fig. 1.

Figure 6:
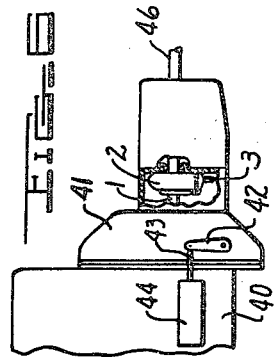
Fig. 6 is a view exemplifying one type of mechanism which may be controlled.

To exemplify the assembly and operation of the device, a simple installation is shown in Fig. 6. In this view a suitable engine is shown at 40 with a clutch housing. The clutch may be operated by an arm 42 connected to the piston rod 43 of a cylinder 44. The clutch and the piston within the cylinder are not shown as these are well known to those versed in the art, but it will suffice to say that the cylinder is connected to the outlet side of the pump and when the pressure of the hydraulic medium rises to a desired extent the arm 42 is rocked to cause engagement of the clutch. There may be transmission gearing in the case 45 while the final output shaft is shown at 46. This construction may be in any sort of automotive vehicle or for that matter, connected to other apparatus to be operated by the engine.

In the operation of the structure illustrated in Fig. 1, let it be assumed that the pump is mounted within a housing 41 so that it is operated directly by the engine through the means of the shaft 1. When the engine and the oil (hydraulic medium) are cold, the chamber 31 contracts and at a selected low temperature, the land 23 may substantially register with the wall 36 of the port 35 so that the port is completely open. Now, the normal idling speed of the engine may be about 500 R. P. M., but when the engine is cold, a higher idling speed is necessary. The higher the speed, the faster the rotation of the pump and, therefore, the higher the pressure. But with the cold engine operating, say, 800 R. P. M. or 900 R. P. M., the high pressure port 20 is in communication with the outlet passage 35 through the port 25 and, therefore, the pressure is relieved. Accordingly, in sufficient pressure is attained at such idling speed to operate the mechanism for engaging the clutch as shown at Fig. 6. However, upon further increase of the R. P. M. the pressure increases with the speed and the clutch may be engaged.

As the engine and the hydraulic medium become heated in use, the heat sensitive seat expands and gradually moves the piston valve to the left as Fig. 1 is viewed, against the action of the spring 26 thus gradually closing the port 35. As shown in Fig. 1, the piston valve is in a position where the port 35 is fully open. In this position, the face of the land 23 substantially intersects the point at the innermost part of the inclined face 37 of the port. At about the time the port 35 is completely closed the piston head 20 is in a position to start to open the port 21.

Now, when the port 35 is closed and the engine is at normal running temperature, the engine may idle at a normal speed of about 500 R. P. M. and the pressure attained is insufficient to operate the automatic power transmitting mechanism. Upon an increase of engine R. P. M., however, the pressure increases and the power transmitting mechanism may be actuated at an engine speed which is less than that of the actuation when the engine is cold. Indeed, the mechanism may be actuated at an engine speed lower than the idling R. P. M. of the cold engine. Thus, the structure provides for a cold engine high idle and yet automatically adjusts itself to provide a proper operation of the mechanism for a normal idling condition when the engine is at normal running temperatures.

The relief valve is also pressure sensitive. The pressure is, of course, communicated through the port 33 to the right hand side of the land 23 of the piston valve and as the pressure increases the valve is shifted thereby against the action of the spring 26. This opens the port 21 to an extent depending upon the pressure thus providing a direct by-pass for the hydraulic medium from the high side of the pump to the low side. In other words, the medium may flow through the port 20, port 25 and 21 so that the desired pressure is maintained.

The function of the structure shown in Fig. 3 is the same as that of the structure shown in Fig. 1, the difference being that the temperature sensitive seat is an expansible and contractable rod in place of a sealed chamber.

Figure 7:
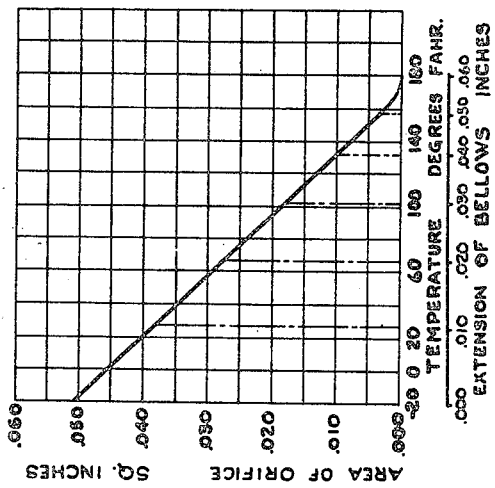
Fig. 7 shows a graph illustrating the control of the orifice through a range of temperatures.

The formation of the port 35 and the port 35a provides an important function. Generally, as the piston moves to the left from a wide open port condition to a closed port condition, equal increments of movement of the piston effects disproportionate variations in the orifice opening. This can be appreciated by reference to the developed view of Fig. 9. The land 23 overlaps the orifice wall 37 gradually, in the movement to the left of the piston valve, starting first near the center line and gradually moving upwardly to the top center point as shown in Fig. 1. Moreover, the expansion of the liquid in the seat may not be, and preferably is not, a linear function with respect to temperature changes, as illustrated by the graph in Fig. 7. The exemplary orifice graph illustrated in Fig. 7 is plotted against both bellows extension and temperature and is based upon the use of a charging liquid of 50% ethylene glycol and 50% water. This solution has an adequate temperature change for automotive use. It will be noted from the graph that the expansion of the bellows is not a linear function with respect to temperature change. It is, indeed, an exponential function. A part of the practical effect of this exponential expansion curve lies in the fact that with the lower temperatures of the hydraulic medium, the orifice openings increase disproportionately which in turn requires a disproportionate increase in engine speed to produce the same pressure per square inch for the packing of the clutch for example. This provides compensation for a high engine idle when the engine and hydraulic medium are cold. It will be noted from the graph that at 20° F. the orifice is wide open at .050 square inch. The first .010" of the extension of the bellows requires a temperature change from −20° to +28° or a temperature differential of 48° which causes an orifice change from .050 square inch to .038, a decrease of .012 square inch. This action occurs progressively and the final extension of .010 inch of the bellows takes place through a temperature range of about 22° and an orifice change from about .0035 square inch to 0, a decrease of .0035 square inch. In other words, the first .010 extension of the bellows causes an orifice area change of about 3½ times greater than the same extension at the higher temperature.

With the orifice as shown in Figs. 1 and 3 formed with the angular face 37, equal movements of the piston valve cut off disproportionate areas of the orifice so that the same general effect, to lesser extent, would occur if the expansion curve of the bellows change were a true linear function with respect to temperature. The exponential type of expansion curve, therefore, in combination with the characteristics of the angularly formed orifice, are cumulative and combine to result in an exaggerated differential change in orifice opening at the lower temperatures of the hydraulic medium.

Exemplary pressure curves are illustrated in Fig. 8, it being understood that these curves are made merely for demonstrative purposes. Assuming that a pressure of 50 pounds per square inch is required to operate the power transmitting mechanism, at 0° F., this pressure is reached at about 1550 R. P. M. Therefore, the engine may be idled at any speed below this point without operation of the power transmitting mechanism. At 75° F. this pressure is attained at about 1050 R. P. M. At 185° F., which is somewhere near a normal idling temperature, this pressure is attained at about 650 R. P. M.

Figure 4:
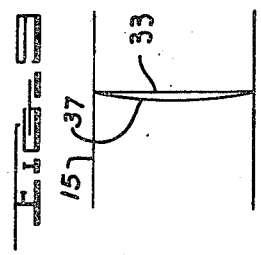
Fig. 4 is a cross sectional view taken through a valve which is constructed separately from a pump.

In the form illustrated in Fig. 4, the temperature sensitive relief port is separated from the piston. Also, the valve body is shown as a structure separate and distinct from a pump. In this form, the relief valve body 50 has a cylinder 51 closed at its ends except for a port 52 and it has a high pressure inlet 53 and an outlet to the sump for the hydraulic medium at 54. The piston valve has a head or land 55 and a head or land 56 with a port 57 therebetween and it is acted upon by a spring 58. The head 55 is provided with a port 59. As previously explained, as the pressure increases the pressure is transmitted through the port 59 and sufficient pressure will cause the piston valve to move to the left against the action of the spring and thus bypass the incoming hydraulic medium through the port 57 and back to the sump at 54 thus to maintain a desired pressure in accordance with speed. The valve body has a cylinder 60 with a valve member 61 therein provided with a pressure sensitive seat 62 which, as shown, is in the form of a sealed expandable and contractable chamber containing a substantially non-compressible liquid. In this case the valve member 61 may be attached directly to the end of the bellows and it has a head 63 for controlling a discharge orifice 64. A port 65 connects the two cylinders and is in a position to be throttled and closed by the head 55. Under a cold condition, the parts are in the position shown in Fig. 4 and the pressure is relieved by exhaust through the port 65 and port 64. As the temperature increases the port 64 is gradually closed whereupon the pressure control is governed by speed. As the pressure increases incident to speed the piston valve shifts against the action of the spring providing a by-pass from the pressure inlet 53 to the exhaust to the sump at 54.

In this form, as shown in Fig. 4, as well also as the form shown in Figs. 1 and 3, the actions of the control incident to temperature and speed are more or less in series or act alternately. With the parts positioned, as shown in Fig. 4, the pressure control is attained by the temperature condition, the port 64 being open.

Upon pressure increase, due to speed, the piston valve 55 shifts and closes the port 65 at just about the same time the head 56 opens the exhaust port 65. At this time the temperature control ceases and the speed control takes over even though the temperature exhaust port 64 is open or partly open. Upon a pressure drop which allows the piston 55 to shift back to the position shown in Fig. 4, the sump port is closed thus cutting out the speed control and the port 65 is opened thus restoring the action of the temperature control. Of course, after the port 64 is closed by increase in temperature, the control is exclusively incident to speed.

In Fig. 5, a valve structure is shown which is essentially the same in the general structure with that as shown in Fig. 4 with like reference characters applied to like parts, but in this case the speed control and the temperature control act conjointly. This occurs because of the provision of port 65a which is elongated axially of the cylinders. With the parts positioned as shown in Fig. 5, the pressure is governed by the temperature. However, if the pressure increases sufficiently incident to speed to shift the piston valve to the left the hydraulic medium is bypassed from the pressure intake to the exhaust and to the sump, but the port 65 remains open so that the pressure is under the conjoint control of speed and pressure. Of course, if, incident to temperature increase, the exhaust port 64 is closed the control is then incident to speed.

We claim:

1. A pressure control device for a hydraulic system comprising, a chambered body, said body having a high pressure inlet port and first and second relief outlet ports, valving means in the chamber including a member for opening and closing a connection between the high pressure inlet port and the first outlet port, said valving means being subject to and movable by the pressure of the hydraulic medium whereby to establish said connection when moved by the pressure of the medium to thereby govern the pressure, said valving means including a valving member for controlling the second relief outlet port, and a thermo-sensitive member for positioning the second named valving member to throttle the second named relief port in accordance with temperature changes.

2. A pressure control device for a hydraulic system comprising, a chambered body, said body having a high pressure inlet port and first and second relief outlet ports, valving means in the chamber including a member for opening and closing a connection between the high pressure inlet port and the first outlet port, said valving means being subject to and movable by the pressure of the hydraulic medium whereby to establish said connection when moved by the pressure of the medium to thereby govern the pressure, said valving means including a valving member for controlling the second relief outlet port, and a temperature sensitive expandable and contractable element for positioning the second named valving member whereby to open and close the second named relief port at low and high temperatures respectively.

3. A pressure control device for a hydraulic system comprising, a chambered body, said body having a high pressure inlet port and first and second relief outlet ports, valving means in the chamber including a member for opening and closing a connection between the high pressure inlet port and the first outlet port, said valving means being subject to and movable by the pressure of the hydraulic medium whereby to establish said connection when moved by the pressure of the medium to thereby govern the pressure, said valving means including a valving member for controlling the second relief outlet port, and a seat for the second named valving member including a bellows-type of chamber with a substantially incompressible liquid sealed therein and which expands and contracts with temperature changes for positioning the second named valving member to throttle the second named relief port.

4. A pressure control valve for a hydraulic system comprising, a cylinder, said cylinder having a high pressure inlet port and first and second relief outlet ports, a piston valve in the cylinder, a seat for the piston valve, said piston valve being arranged to normally close off the inlet port from the first relief port, said piston valve being subject to and movable by the pressure of the hydraulic medium to open the connection between the inlet port and the first relief port to thereby control the pressure, the seat for the piston valve being thermo-sensitive and arranged so that at relatively low temperatures the second relief port is open, said thermo-sensitive seat expanding with temperature increase to cause the piston valve to move and throttle the second relief port.

5. A pressure control valve for a hydraulic system comprising, a cylinder, said cylinder having a high pressure inlet port and first and second relief outlet ports, a piston valve in the cylinder, a seat for the piston valve, said piston valve being arranged to normally close off the inlet port from the first relief port, said piston valve being subject to and movable by the pressure of the hydraulic medium to open the connection between the inlet port and the first relief port to thereby control the pressure, the seat for the piston valve being thermo-sensitive and arranged so that at relatively low temperatures the second relief port is open, said thermo-sensitive seat expanding with temperature increase to cause the piston valve to move and throttle the second relief port, the said seat for the piston valve comprising, an expansible and contractable bellows with a substantially incompressible liquid sealed therein.

6. A speed and temperature sensitive relief valve for a hydraulic system having a pump comprising, a cylinder, said cylinder having a high pressure inlet port and first and second relief outlet ports, a piston valve in the cylinder, a seat for the valve, a spring acting upon the piston valve and normally holding it to close the connection between the inlet port and a first outlet port, the piston valve having a passage therein so that it is subject to and movable by the pressure of the hydraulic medium so that as the pressure increases incident to pump speed the piston valve shifts against the spring to open the first relief port and thereby control the pressure, the seat for the piston valve comprising a thermo-sensitive element which positions the piston valve so that the second relief port is open at relatively low temperatures and is throttled and closed upon temperature increase.

7. A speed and temperature sensitive relief valve for a hydraulic system having a pump comprising, a cylinder, said cylinder having a high pressure inlet port and first and second relief outlet ports, a piston valve in the cylinder, a seat for the valve, a spring acting upon the piston valve and normally holding it to close the connection between the inlet port and a first outlet port, the piston valve having a passage therein so that it is subject to and movable by the pressure of the hydraulic medium so that as the pressure increases incident to pump speed the piston valve shifts against the spring to open the first relief port and thereby control the pressure, the seat for the piston valve comprising a thermo-sensitive element which positions the piston valve so that the second relief port is open at relatively low temperatures and is throttled upon temperature increase, the second relief port being in the form of an arcuate kerf in the wall of the cylinder so that as the piston valve moves by expansion of the seat upon temperature elevation the orifice opening of the second relief valve decreases disproportionately to equal increments of movement of the piston valve.

8. A speed and temperature sensitive relief valve for a hydraulic system having a pump comprising, a cylinder, said cylinder having a high pressure inlet port and first and second relief outlet ports, a piston valve in the cylinder, a seat for the valve, a spring acting upon the piston valve and normally holding it to close the connection between the inlet port and the first outlet port, the piston valve having a passage therein so that it is subject to and movable by the pressure of the hydraulic medium so that as the pressure increases incident to pump speed the piston valve shifts against the spring to open the first relief port and thereby control the pressure, the seat for the piston valve comprising a thermo-sensitive element which positions the piston valve so that the second relief port is open at relatively low temperatures and is throttled upon temperature increase, the second relief port having an angular orifice wall so that equal increments of movement of the piston valve incident to expansion of the seat closes progressively ensmalling disproportionate areas of the orifice.

9. For controlling the pressure of a hydraulic system operable by an internal combustion engine, a speed and temperature sensitive pressure relief valve comprising a cylinder, said cylinder having an inlet port connected to a pump in the system, said cylinder having a first relief outlet port, a piston valve in the cylinder subject to and movable by the pressure of the hydraulic medium introduced through the inlet port, said piston valve arranged to control the connection and disconnection between the inlet port and relief port to thereby control the pressure of the medium, said cylinder having a second relief port, and a thermo-sensitive seat for the piston valve arranged to position the valve to throttle the second relief port in accordance with temperature conditions.

10. A device substantially as described comprising, a pump body, means therein for pumping a hydraulic medium, said body having a cylinder, the cylinder having a high pressure inlet communicating with the high pressure side of the pump and a first relief outlet communicating with the low pressure side of the pump, a piston valve in the cylinder, said piston valve being subject to and movable by the pressure of the hydraulic medium entering through the inlet port and adapted to control a direct connection between the inlet port and the said relief port to thereby govern the pressure as it may increase incident to speed of the pump, said cylinder having a second relief port, and a thermo-sensitive seat for the piston valve subject to expansion incident to temperature increase for shifting the valve to throttle the second relief port and thereby control the pressure incident to temperature changes.

11. A pressure control device for a hydraulic system comprising, a body having a cylinder therein, said cylinder having a high pressure inlet and a pressure relief outlet, a piston valve in the cylinder, said piston valve being subject to and movable by the pressure of the hydraulic medium entering the inlet and adapted in its movement to open and close a connection between the inlet port and the relief port to thereby control the pressure, a chamber adjacent the cylinder, a port connecting the cylinder and the chamber, a relief port in the chamber, a valve member for controlling the relief port and a temperature sensitive element for shifting the valve member in said chamber to throttle the relief port thereof in accordance with temperature changes.

12. A pressure control device for a hydraulic system comprising, a body having a cylinder therein, said cylinder having a high pressure inlet and a pressure relief outlet, a piston valve in the cylinder, said piston valve being subject to and movable by the pressure of the hydraulic medium entering the inlet and adapted in its movement to open and close a connection between the inlet port and the relief port to thereby control the pressure, a chamber adjacent the cylinder, a port connecting the cylinder and the chamber, a relief port in the chamber, a valve member for controlling the relief port and a temperature sensitive element for shifting the valve member in said chamber to throttle the relief port thereof in accordance with temperature changes, the port between the cylinder and the chamber being so relatively disposed and positioned that it is closed by the piston valve substantially when the piston valve has moved to open the connection between the high pressure inlet port and the outlet relief port in the cylinder, whereby the controlling action of the piston relief valve and the valve actuated by the temperature sensitive element operate in sequence.

13. A pressure control device for a hydraulic system comprising, a body having a cylinder therein, said cylinder having a high pressure inlet and a pressure relief outlet, a piston valve in the cylinder, said piston valve being subject to and movable by the pressure of the hydraulic medium entering the inlet and adapted in its movement to open and close a connection between the inlet port and the relief port to thereby control the pressure, a chamber adjacent the cylinder, a port connecting the cylinder and the chamber, a relief port in the chamber, a valve member for controlling the relief port and a temperature sensitive element for shifting the valve member in said chamber to throttle the relief port thereof in accordance with temperature changes, the port between the cylinder and said chamber being arranged and positioned so that the same remains substantially open at all times, whereby the controlling action of the piston valve and the controlling action of the temperature sensitive valve operate conjointly.

14. A pressure control device for a hydraulic system comprising, a body having a chamber therein, said chamber having ports therein for the inlet of hydraulic medium under pressure from the hydraulic system and for the outlet of the hydraulic medium from the chamber to relieve the pressure, a shiftable valve member in the chamber for controlling and throttling the connection between the inlet and the relief ports, said valve member being subject to and movable by the pressure of the hydraulic medium, whereby the valve member controls the communication between the inlet and relief ports in accordance with the pressure of the hydraulic medium, and a thermo-sensitive member subject to the temperature of the hydraulic medium and active upon the valve member for shifting the same, whereby to control the communication between the inlet and the relief ports in accordance with the temperature of the hydraulic medium.

ERNEST E. WEMP.

REFERENCES CITED

The following references are of record in the file of this patent:

UNITED STATES PATENTS

| Number | Name | Date |
| --- | --- | --- |
| 1,899,396 | Ray | Feb. 28, 1933 |
| 2,364,489 | Taylor | Dec. 5, 1944 |